United States Patent [19]

Kishida

[11] Patent Number: 4,528,421

[45] Date of Patent: Jul. 9, 1985

[54] PORCELAIN GAS-FILLED BUSHING WITH ELECTRODES FOR MODERATING THE ELECTRIC FIELD

[75] Inventor: Mitsuhiro Kishida, Itami, Japan

[73] Assignee: Mitsubishi Denki Kabushiki Kaisha, Tokyo, Japan

[21] Appl. No.: 550,621

[22] Filed: Nov. 10, 1983

[30] Foreign Application Priority Data

Nov. 17, 1982 [JP] Japan ............................... 57-203101

[51] Int. Cl.³ .................... H01B 17/28; H01B 17/36; H01B 17/42
[52] U.S. Cl. ................................. 174/143; 174/31 R
[58] Field of Search ................... 174/31 R, 73 R, 142, 174/143

[56] References Cited

U.S. PATENT DOCUMENTS 4,159,401 6/1979 Kamata ......................... 174/143 X

FOREIGN PATENT DOCUMENTS

| 52-104798 | 9/1977 | Japan | 174/143 |
| 54-20398 | 2/1979 | Japan | 174/142 |
| 54-85393 | 7/1979 | Japan | 174/142 |
| 55-144615 | 11/1980 | Japan | 174/143 |

*Primary Examiner*—Laramie E. Askin
*Attorney, Agent, or Firm*—Wenderoth, Lind & Ponack

[57] ABSTRACT

A porcelain gas-filled bushing wherein a central conductor passes through a porcelain tube which is filled with an insulating gas, a fitting flange which is fastened to one end of the porcelain tube is grounded, and an electrode which encircles the central conductor at a predetermined spacing therefrom and which is covered with an insulating member is electrically connected with the fitting flange. Alternatively, several electrodes fitting within each other may be provided around the central conductor. In one embodiment the electrodes are conical and flare radially outwardly of said central conductor from a lower end toward an upper end thereof.

3 Claims, 7 Drawing Figures

FIG. 3
FIG. 4
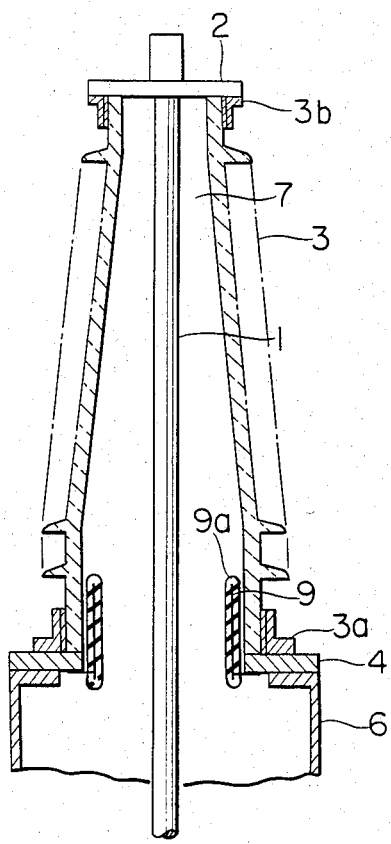
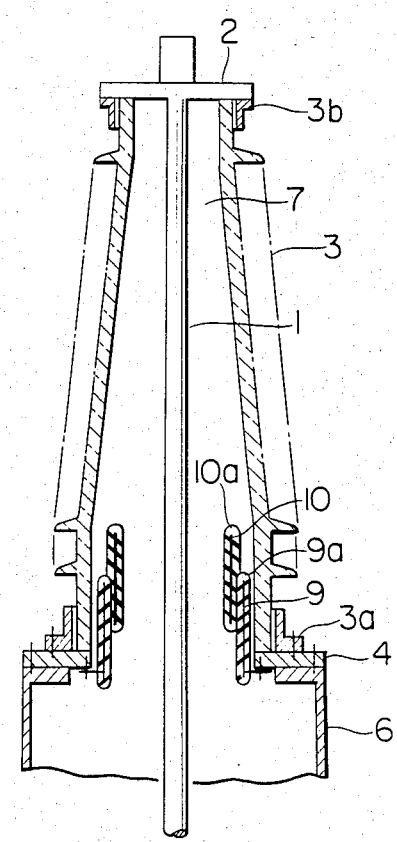

PORCELAIN GAS-FILLED BUSHING WITH ELECTRODES FOR MODERATING THE ELECTRIC FIELD

BACKGROUND OF THE INVENTION

This invention relates to a bushing in which the concentration of an electric field is moderated.

FIG. 1 shows a prior-art bushing. Referring to the figure, numeral 1 designates a central conductor, numeral 2 an upper terminal which is connected with the central conductor 1, and numeral 3 a porcelain tube which has the central conductor 1 inserted in the hollow part thereof. Symbol 3a denotes a fixture which is fastened to one end of the porcelain tube 3, while symbol 3b denotes a fixture which is fastened to the other end of the porcelain tube 3 and through which the upper terminal 2 and the other end of the porcelain tube 3 are hermetically fixed. Numeral 4 indicates an electrically grounded fitting flange on which the fixture 3a is mounted, and numeral 5 an electrode which is disposed in the bore part or annular hole of the fitting flange 4 and which moderates the concentration of an electric field at the upper end part of the fixture 3a. The electrode 5 is constructed in the shape of a cylinder encircling the central conductor 1 at a predetermined spacing therefrom, and it has a predetermined length from the one end toward the other end of the porcelain tube 3. A vessel 6 has a base portion 6a at the top end thereof, and the fitting flange 4 is mounted on the base portion 6a. Upon attaching the flange 4 to the base portion 6a, the one end of the porcelain tube 3 is hermetically fixed to the vessel 6 for receiving electrical equipment therein, and one end of the electrode 5 is connected with the vessel 6. The interior of the porcelain tube 3 as well as the vessel 6 is filled with an insulating gas 7 under a predetermined high pressure.

In a bushing of such construction, when a voltage is applied to the central conductor 1, equipotential surfaces 8 are distributed as indicated by broken lines in FIG. 2, and a concentration of the electric field lines develops at the upper end part A of the electrode 5.

Here, the upper end part A of the electrode 5 is surrounded with the high pressure insulating gas 7 exhibiting a high dielectric strength, and thus a high, corona causing, electric field strength develops therein. In contrast, the upper end part B of the fixture 3a is surrounded with atmospheric air, and hence, a low corona causing electric field strength is developed therein. When the height of the electrode 5 is reduced, the distribution of the equipotential surfaces changes to lower the electric field strength at part A and to raise that at part B.

In general, the electrical design of a bushing conforms with a procedure wherein, with reference to the highest voltage to be applied between the central conductor 1 and the fitting flange 4, the height of the electrode 5 is determined so that the electric field strength of part B becomes less than the breakdown voltage of the atmospheric air, while the electric field strength of the upper end part A of the electrode 5 is set to be less than the breakdown voltage of the ambient insulating medium. Accordingly, the flashover voltage of the assembled bushing is determined by the magnitude of the electric field strength of the upper end part B of the fixture 3a. As the upper end of the electrode 5 becomes higher than that of the fixture 3a, the electric field strength of part B lowers more, and the flashover voltage of the exterior rises more. However, the electric field strength of the upper end part A of the electrode 5 rises more as this part becomes more remote from the upper end part B of the fixture 3a. It is considered that, when parts A and B are made extremely distant, there will be a limit at which the conona generating voltage of part A becomes lower than that of part B and beyond which the flashover takes place between the upper end of the electrode 5 and the central conductor 1 inside the bushing.

For this reason, the bushing is so designed as to keep the height of the electrode 5 small in order that the breakdown may occur earlier from the upper end part B of the fixture 3a. In order to enhance the ability of the whole bushing to withstand high voltages, it has been necessary to increase the full length of the porcelain tube. This has led to the disadvantages that the height of the bushing must be greater than in the case of a condenser bushing, and that the cost of manufacture is increased.

SUMMARY OF THE INVENTION

This invention has been made in view of the above, and has for its object to moderate the concentration of the electric field in a bushing in such a way that the surfaces of an electrode which is connected at one end with a vessel and which encircles a central conductor at a predetermined spacing therefrom are formed with an insulating layer by the use of an insulating material.

More concretely, in one embodiment of this invention, a bushing comprises a porcelain tube which is placed and fixed on a vessel for receiving electrical equipment and is filled with an insulating gas, and which communicates with the interior of the vessel; an upper terminal which is fixed to an upper end part of said porcelain tube by an upper fixture, and which hermetically closes an upper end opening of said porcelain tube; a central conductor which passes through a central part of said porcelain tube, and which is electrically connected to said upper terminal; a fitting flange groundable as by a ground wire, and a lower fixture, which are coupled to a base portion provided at a communicating hole part of said vessel, and which hermetically close a peripheral edge of a lower end part of said porcelain tube against the ambient atmosphere; a cylindrical, electric field adjusting electrode which is arranged inside said porcelain tube with a predetermined spacing from said central conductor, and which is electrically connected to said fitting flange; and an insulating member which is formed so as to cover an inner peripheral surface and outer peripheral surface of said electrode and cylinder end parts thereof.

BRIEF DESCRIPTION OF THE DRAWINGS

FIGS. 3 and 4 are longitudinal cross-sectional views each showing an embodiment of this invention;

In the drawings, the same symbols indicate the same or corresponding parts.

DESCRIPTION OF THE PREFERRED EMBODIMENTS

Figure 1:
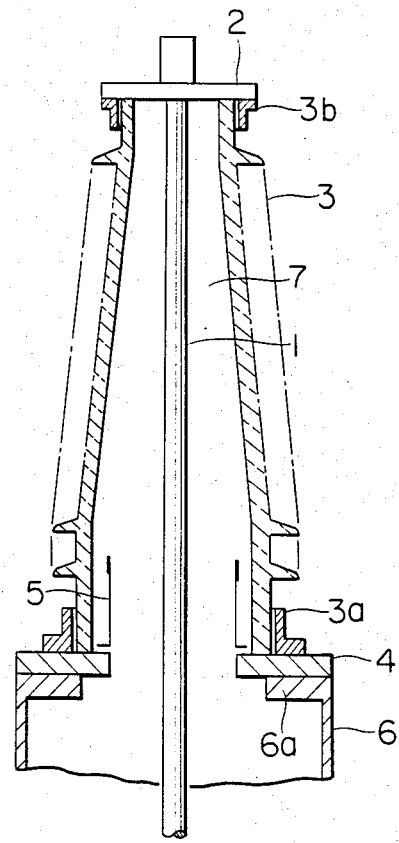
FIG. 1 is a longitudinal cross-sectional view of a prior-art bushing.
Figure 2:
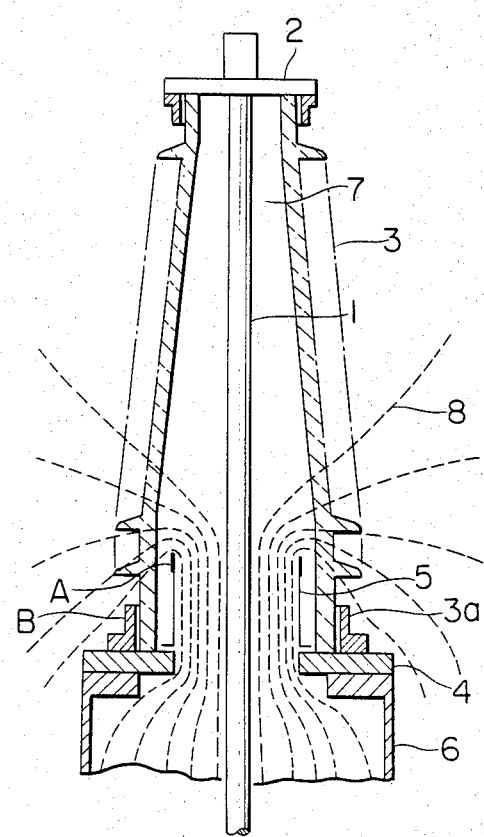
FIG. 2 is a diagram of an electric field distribution in the bushing of FIG. 1.

The invention will now be described with reference to the drawings. FIG. 3 shows an embodiment of this invention, in which numerals 1 to 4, 6 and 7 indicate the same parts as in the prior-art of FIGS. 1 and 2 and shall not be repeatedly explained. Numeral 9 indicates an electrode, which is in the shape of a cylinder having a predetermined diameter encircling the central conductor 1 at a predetermined distance therefrom, which has a predetermined length in its axial direction and one end of which is connected with the fitting flange 4. Shown at symbol 9a is an insulating member which covers the surfaces of the electrode 9. Herein, the insulating member 9a is a tape of plastic film capable of withstanding a high voltage, and the tape is wound on the electrode 9 to a predetermined insulation thickness.

In the bushing of FIG. 3 thus constructed, the dielectric constant of the insulating layer 9a, which is made of the plastic film and which is disposed on the surfaces of the electrode 9, is approximately 3 to 3.3, in contrast to a dielectric constant of 1 (one) of the insulating gas 7. Since the electric field on the surface of the electrode decreases in inverse proportion to the dielectric constant, the field strength of the surface of the electrode 9 when provided with the insulating layer 9a is lowered by about $\frac{2}{3}$. In addition, the surface of the insulating layer 9a has a decreased curvature, so that the field strength becomes still lower. Thus, the limit of the field strength on the surface of the upper end of the electrode 9 can be raised up to the dielectric strength of the insulating layer 9a.

Figure 5:
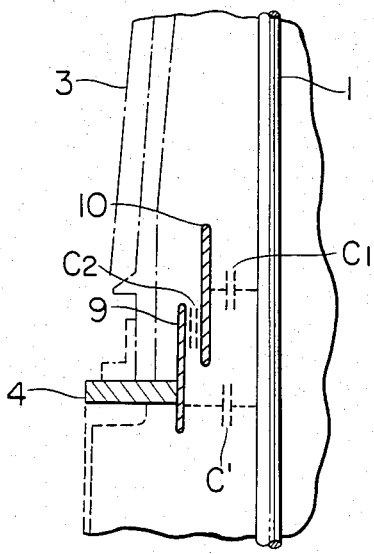
FIG. 5 is a diagram for explaining the operation of the bushing shown in FIG. 4.

FIG. 4 shows another embodiment. In the other end part of the electrode 9, there is inserted an electrode 10 whose surfaces are provided with an insulating layer 10a of predetermined thickness. The electrode 10 with insulating layer 10a has a predetermined outside diameter which is smaller than the outside diameter of the electrode 9 and insulating layer 9a and which is reduced at a part of predetermined length at one end with respect to the other end. As illustrated in FIG. 5, the potential of the electrode 10 becomes equal to a value obtained by dividing a voltage by the capacitance $C_1$ between the central conductor 1 and the electrode 10 and the capacitance $C_2$ between the electrode 9 and the electrode 10. Therefore, letting E denote the voltage applied across the electrode 9 and the conductor 1, the potential $e_1$ of the electrode 10 relative to the grounded electrode 9 becomes as follows:

$$e_1 = E \cdot \frac{C_1}{C_1 + C_2}.$$

Thus, the concentration of the electric field is shared by the respective electrodes 9 and 10.

Accordingly, in a case where the electrode 10 is constructed of a plurality of parts which are successively joined by inserting one end of a part into the other end of another part and where such electrode 10 is inserted into the other end of the electrode 9, the number of places to share the concentration of the electric field increases in proportion to the number of the electrode parts, so that the potential to be shared by one place becomes lower, and the potential at the upper end position of the combined electrode can be made still higher.

Thus, the electric field strength of the upper end of the fixture 3a becomes still lower, and the electric field distribution on the surface of the porcelain tube 3 becomes more uniform.

Figure 6:
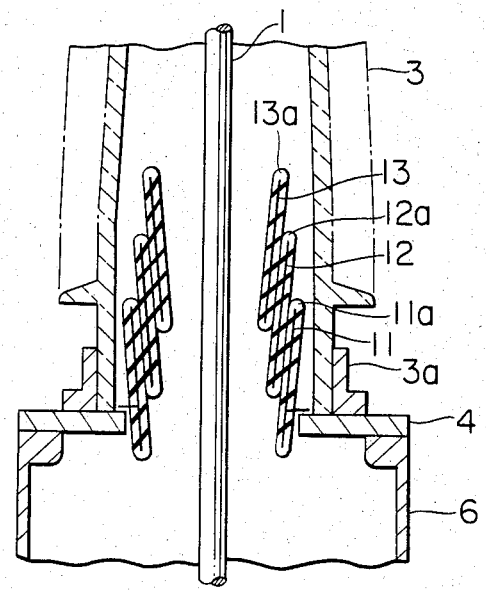
FIG. 6 is a longitudinal cross-sectional view of another embodiment.
Figure 7:
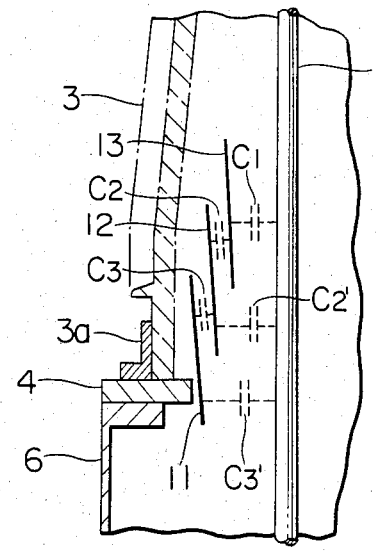
FIG. 7 is a diagram for explaining the operation of the bushing shown in FIG. 6.

FIG. 6 shows still another embodiment. An electrode 11 which is connected with the vessel 6 through the fitting flange 4 is constructed with a generally conical shape one end of which has a predetermined diameter and the other end of which is flared so as to become larger than the one end by a predetermined value. The electrode 11 is provided with an insulating layer 11a which covers the surfaces of the electrode 11 by the use of an insulating member of predetermined thickness. Inserted in the other end of this electrode 11 is an electrode 12 which has a diameter smaller than that of the electrode 11 and whose surfaces are formed with an insulating layer 12a made of an insulating member. Further inserted in the electrode 12 is an electrode 13 which has a diameter smaller than that of the electrode 12 and whose surfaces are covered with an insulating layer 13a. Thus, as illustrated in FIG. 7, when a voltage applied to the whole bushing is denoted by E (V), a potential $e_{12}$ acting on the electrode 12 becomes:

$$e_{12} = \frac{C_1 C_3}{C_1 C_2 + (C_1 + C_2)(C_3 + C_2')} \cdot E \text{ (V)}.$$

A potential $e_{13}$ acting on the electrode 13 becomes:

$$e_{13} = \frac{C_1(C_2 + C_3) + C_2'(C_1 + C_2)}{C_1 C_2 + (C_1 + C_2)(C_3 + C_2')} \cdot E \text{ (V)}.$$

When each of the electrodes 11, 12 and 13 is so formed as to flare at the other end relative to the one end as shown in the figure, the upper end of each electrode lies farther from the central conductor 1, and the degree of concentration of the electric field becomes lower than in the case of the electrode in the shape of the straight cylinder both the ends of which have an identical diameter, so that the dielectric strength is more enhanced. This also applies to the other embodiments. In addition, the electrode structure flared from the one end toward the other end brings forth the advantage that, even when the number of electrodes is increased, electrodes having the same shape can be readily stacked by selecting the dimensions thereof.

In each of the foregoing embodiments, the insulating layer of the electrode has been explained as being a plastic film. However, the same effect as in the embodiments can be expected even when the electrode is covered with an epoxy resin by injection molding or when insulating paper is wound on the electrode and impregnated with an epoxy resin which is then hardened. Further, the fluid to fill the interior of the porcelain tube is not restricted to the insulating gas mentioned above, but it may well be an insulating oil or air.

What is claimed is:

1. A bushing for connection to a vessel which contains electrical equipment and has a base portion provided with a vessel opening, and to be filled with an insulating gas, said bushing comprising:
   a porcelain tube having an upper end opening and a lower end opening;
   an upper terminal over said upper end opening;
   an upper fixture fixing said upper terminal over said upper end opening so as to hermetically seal said upper end opening;

a central conductor, passing centrally through said porcelain tube, electrically connected to said upper terminal;

means, including an electrically groundable fitting flange and a lower fixture coupleable to the base portion of the vessel, for mounting said porcelain tube to the base portion of the vessel with said lower opening in fluid communication with the vessel opening, so as to hermetically seal the periphery of said lower end opening against the intrusion of atmospheric air;

an electric field adjusting electrode having inner and outer peripheral surfaces terminating at upper and lower peripheral edges, located inside said porcelain tube at a predetermined spacing from said central conductor and electrically connected to said fitting flange, said electrode surrounding said central conductor and being flared radially outwardly from a lower end toward an upper end thereof; and an insulating member covering the inner and outer peripheral surfaces and upper and lower peripheral edges of said electrode.

2. A bushing for connection to a vessel which contains electrical equipment and has a base portion provided with a vessel opening, and to be filled with an insulating gas, said bushing comprising:

a porcelain tube having an upper end opening and a lower end opening;

an upper terminal over said upper end opening;

an upper fixture fixing said upper terminal over said upper end opening so as to hermetically seal said upper end opening;

a central conductor, passing centrally through said porcelain tube, electrically connected to said upper terminal;

means, including an electrically groundable fitting flange and a lower fixture coupleable to the base portion of the vessel, for mounting said porcelain tube to the base portion of the vessel with said lower opening in fluid communication with the vessel opening, so as to hermetically seal the periphery of said lower end opening against the intrusion of atmospheric air;

a first generally conically shaped electric field adjusting electrode having inner and outer peripheral surfaces terminating at upper and lower peripheral edges, located inside said porcelain tube at a predetermined spacing from said central conductor, surrounding said central conductor and being flared radially outwardly of said central conductor from a lower end toward an upper end thereof, and electrically connected to said fitting flange;

a first insulating member covering the entire peripheral surface of said first electrode;

a second generally conically shaped electric field adjusting electrode located inside said first electrode and protruding upwardly therefrom and surrounding said central conductor and being flared radially outwardly of said central conductor from a lower end toward an upper end thereof; and a second insulating member covering the entire peripheral surface of said second electrode.

3. A bushing for connection to a vessel which contains electrical equipment and has a base portion provided with a vessel opening, and to be filled with insulating gas, said bushing comprising:

a porcelain tube having an upper end opening and a lower end opening;

an upper terminal over said upper end opening;

an upper fixture fixing said upper terminal over said upper end opening so as to hermetically seal said upper end opening;

a central conductor, passing centrally through said porcelain tube, electrically connected to said upper terminal;

means, including an electrically groundable fitting flange and a lower fixture coupleable to the base portion of the vessel, for mounting said porcelain tube to the base portion of the vessel with said lower opening in fluid communication with the vessel opening, so as to hermetically seal the periphery of said lower end opening against the intrusion of atmospheric air;

a first generally conically shaped electric field adjusting electrode located inside said porcelain tube at a predetermined spacing about said central conductor, surrounding said central conductor and being flared radially outwardly of said central conductor from a lower end toward an upper end thereof, and electrically connected to said fitting flange;

a first insulating member covering the entire peripheral surface of said first electrode;

a plurality of additional concentric successively adjacent, generally conically shaped electric field adjusting electrodes located inside said first electrode and successively inside and protruding upwardly from adjacent ones thereof; and a plurality of additional insulating members covering the respective entire peripheral surfaces of said plurality of additional electrodes.

* * * * *